June 11, 1968　　　TAKESHI OKAMOTO　　　3,387,521
FIBER TOW CUTTING APPARATUS
Filed April 11, 1966　　　　　　　　　　　　4 Sheets-Sheet 1

Takeshi Okamoto,
INVENTOR

BY Wenderoth,
Lind and Ponack ATTORNEYS

3,387,521
FIBER TOW CUTTING APPARATUS
Takeshi Okamoto, Iwakuni-shi, Japan, assignor to
Teijin Seiki Co., Ltd., Osaka, Japan
Filed Apr. 11, 1966, Ser. No. 541,716
Claims priority, application Japan, Apr. 21, 1965,
40/23,577
2 Claims. (Cl. 83—355)

ABSTRACT OF THE DISCLOSURE

A fiber tow cutting apparatus having two side by side disks with slotted flanges thereon, the flanges being opposed and the slots of the flanges coming into alignment when the disks rotate relative to each other. The second disk is mounted on a shaft which is movable toward and away from the first disk. A rotating cutter is provided for cutting the tow, which is fed between the flanges of the two disks, the cutter having cutter blades moving in the direction in which the slots are aligned and through the aligned slots.

---

This invention relates to a fiber tow cutting apparatus.

This type of apparatus usually consists of a pair of shallow tub-shaped disks of the same size, each disk having a peripheral cylindrically curved flange thereon having a plurality of slots or cutaway portions therein which are adapted to come into alignment with corresponding slots in the flange on the other disk as the two disks are rotated in opposite directions, with the cylindrical flanges adjacent each other. A fiber tow is passed between the portions of the cylindrical flanges which are adjacent each other and is cut by passing a blade through the aligned slots. In the usual apparatus, one of the disks is rotated about a fixed shaft, while the other is rotated about a shaft which moves relative to the fixed shaft, and by pressing the cylindrical flange of the disk which rotates about the movable shaft against the cylindrical flange of the disk which rotates about the fixed shaft, the fiber tow passing between the point of engagement of the disks is held closely where it is cut by the aforesaid blade which moves along a channel formed by the aligned slots. The construction of the conventional apparatus of this kind has heretofore provided for the rotative movement of the fixed shaft to be transmitted to the movable shaft by means of a series of spur gears, and moreover the disk on the movable shaft has been pressed against the disk on the fixed shaft by moving the movable shaft about a pivot, i.e. by angularly displacing the movable shaft. When an apparatus such as this is used, the size of the fiber tow is limited to, say, about 300,000 denier in the case of a synthetic fiber tow, since sizes larger than this cause trouble to occur in the apparatus. In order that the fiber tow to be cut be held firmly as its size increases and the gap between the disks therefore becomes greater, it is natural that the two disks be rotated in the opposite direction while the pressure applied through them to the tow is increased. However, when the power transmission from one shaft to the other is carried out, as hereinabove described, by a plurality of gears, there is an increase in the accumulated backlash in the gears and a lag in the power transmission between the two shafts which impedes the smooth transmission of power. In addition, if distortions occur in the gear shafts, the alignment of the slots becomes incorrect, with the consequence that the passage of the blade through the slots is impeded and makes it impossible to cut the tow.

The present invention has as its object the elimination of the foregoing defects, and it comprises an apparatus in which the slotted disk which rotates about the movable shaft is moved linearly in the pressing direction against the slotted disk which rotates about the fixed shaft, the tow being cut by holding it between the disks and moving a blade through the aligned slots. The apparatus for achieving this object is a fiber tow cutting apparatus which comprises a first slotted disk which is mounted on a fixed shaft and rotates thereabout, a second slotted disk which is secured to a movable shaft so that it not only rotates thereabout but also moves relative to said first slot disk to press the second disk against the first disk. The apparatus further comprises means for rectilinearly moving the second disk in a direction in which it presses against the first disk and for aligning the slots in the flanges of the two disks when the latter are pressed against each other, and a rotating blade which passes through a channel formed by the aligned slots in the flanges of the two disks and cuts the tow which is being fed while being held between the flanges of the two disks. The apparatus of the present invention achieves this by omitting the series of spur gears provided in the conventional apparatus, and by using instead two pairs of helical gears and interposing a splined shaft between the gears, thus making it possible to move one of the shafts toward or away from the other shaft longitudinally of said splined shaft and thus carry out the power transmission between the two shafts. Hence, because the backlash between the gears is reduced to a minimum, the operational limitation on the size of the tow has been removed to make possible the cutting of fiber tows having a size above 300,000 deniers.

Further, in one embodiment of this invention, since the movable shaft moves parallel to and in the same plane as the fixed shaft, relationship of the slots in the flanges on the two disks can be kept constant. Hence, no lag occurs between the slots in the flanges of the two disks which are pressed against each other. Therefore, a feature of the apparatus is that the rotating blade can pass smoothly through a channel formed by the slots and cut the tow.

Other features and objects of this invention will be apparent from the following description taken in connection with the accompanying drawings, wherein.

Figure 1:
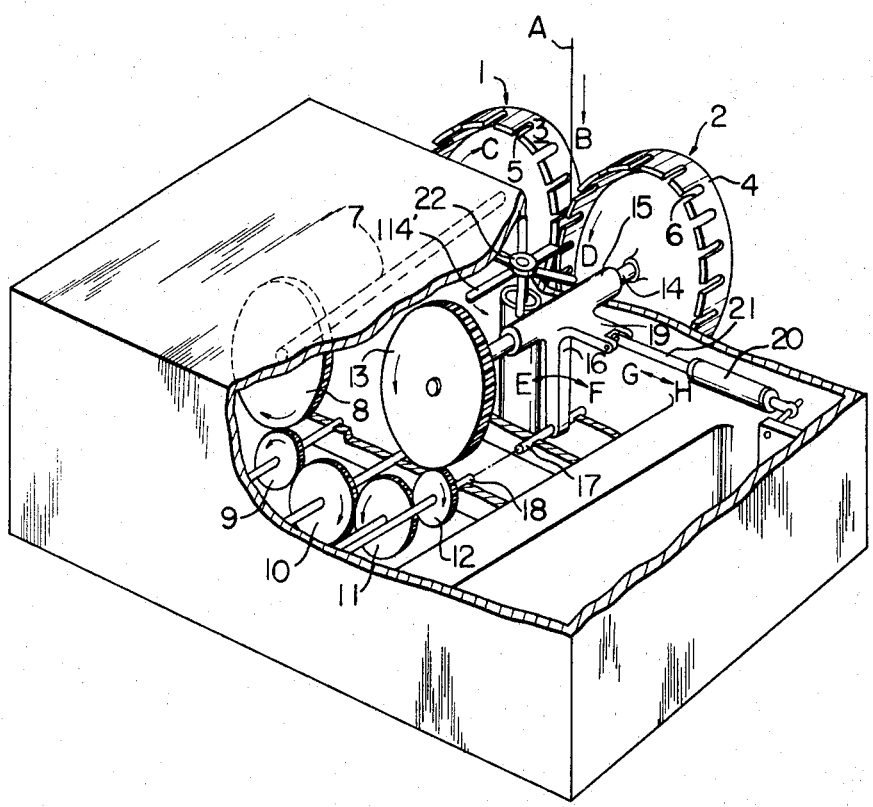
FIG. 1 is a perspective view, partly broken away, of a conventional fiber tow cutting apparatus.

Referring to FIG. 1, a conventional apparatus comprises a pair of shallow tub-shaped cylindrical disks 1 and 2 of identical shape having one side open. Slots 5 and 6 of the same length and width are equidistantly spaced from each other along the curved cylindrical flanges 3 and 4 of said disks, said slots being parallel with the shafts upon which the disks are mounted. One end of each of the slots opens out of the side edge of the flange 3 or 4. These disks are so disposed that when the open sides face in the same direction and the curved flange surfaces are adjacent each other, corresponding slots 5 and 6 are in alignment with each other. At the opposite end of shaft 7 on which the first disk is mounted, a spur gear 8 is provided which meshes with a series of spur gears 9, 10, 11, 12, through which the rotation of the disk 1 is transmitted to a gear 13 on a shaft 14 on which the second disk 2 is mounted so as to rotate the second disk 2 in a direction opposite to that of disk 1. If the disks 1 and 2 are of the same size and they rotate at a same speed in the directions of arrows C and D, a fiber tow A that is delivered from the direction of arrow B is held between the curved flanges of the disks.

Shaft 14 is journaled in a frame 15, and an arm 16 extending from the frame has at its remote end a shaft 17 which is freely journaled, in a manner not shown, in a shaft 18 on which the gear 12 is mounted. On the other hand, another arm 19 extending from the frame 15 is coupled to the rod 21 of a piston-cylinder mechanism 20. Shaft 14 is normally swung in the direction G around the shaft 17 by pressure exerted by the cylinder 20 through the rod 21, and thus the curved flange surfaces 5 and 6 are pressed into close contact at all times. A rotating cutter 22 having a plurality of radially extending blades 23 is disposed adjacent said contacting curved flange surfaces 5, 6, the cutter blades being adapted to pass during their rotation through a channel formed by two aligned slots to cut the fiber tow which has been fed between the curved flange surfaces. As the size of the fiber tow increases, the gap between the curved surfaces 5 and 6 widens. Hence, with the shaft 7 fixed, the shaft 14 moves away from the fixed shaft 7 against the piston pressure a distance equal to the thickness of the tow. Thus, with the arm 16 turning around the shaft 17, the shaft 14 is moved in the direction F to move the piston rod in the direction H, so that the distance between the curved flange surfaces 5 and 6 is maintained appropriately equal to the thickness of the fiber tow.

In a mechanism such as described above, there is a limit to the amount of power that can be transmitted on account of the backlash which occurs during the meshing of the pair of gears in the gear train 8, 9 . . . 13. In a fiber tow cutting apparatus, as the tow becomes thicker and the area which is contacted under the effect of the piston pressure is enlarged, there is a need for a greater amount of power to be transmitted to the shaft 14 from the shaft 7. However, in the conventional type of apparatus, a 100% transmission of power between the shafts 7 and 14 cannot take place due to the backlash existing during the meshing of the gears. In consequence, the disk 2 lags the disk 1 and their synchronism is lost. Further, either the gears or the gear shafts can be damaged, because the transmission of power is not carried out satisfactorily between the gears. In addition, as a result of the loss of synchronism between the disks, the alignment of the slots at the contacting surfaces of the disks is lost, and the smooth passage of the cutter blade through the channel formed by the slots at the contacting surfaces of the disks can no longer take place, thus making it impossible to perform a satisfactory cutting action.

While the disks used in the apparatus of the present invention are identical to those conventionally used, the means for transmitting the power from the shaft of the first disk to the shaft of the second disk is different. This will now be described with reference to FIGURES 2–4, in which the reference numerals used to indicate similar members are the same as those used in FIG. 1.

Figure 2:
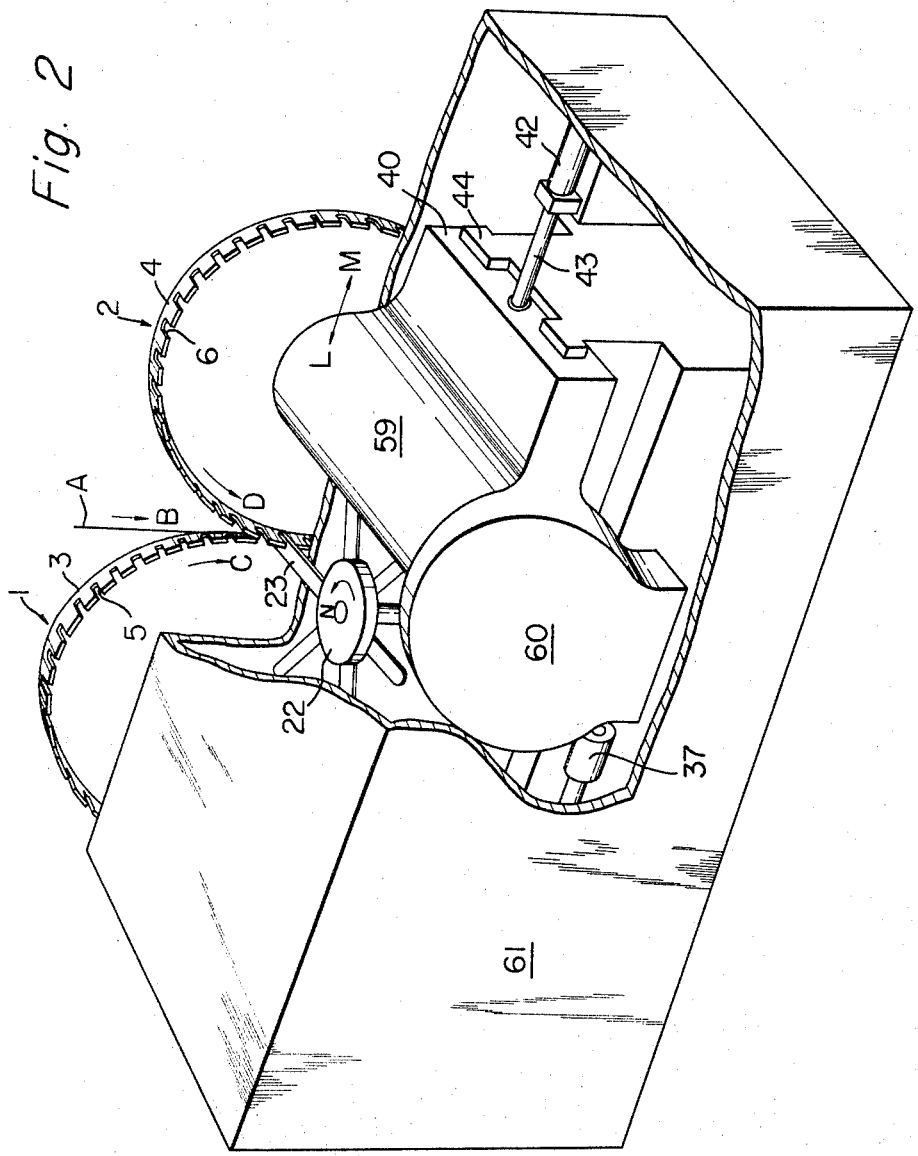
FIG. 2 is a perspective view, partly broken away, of an apparatus according to the present invention.
Figure 3:
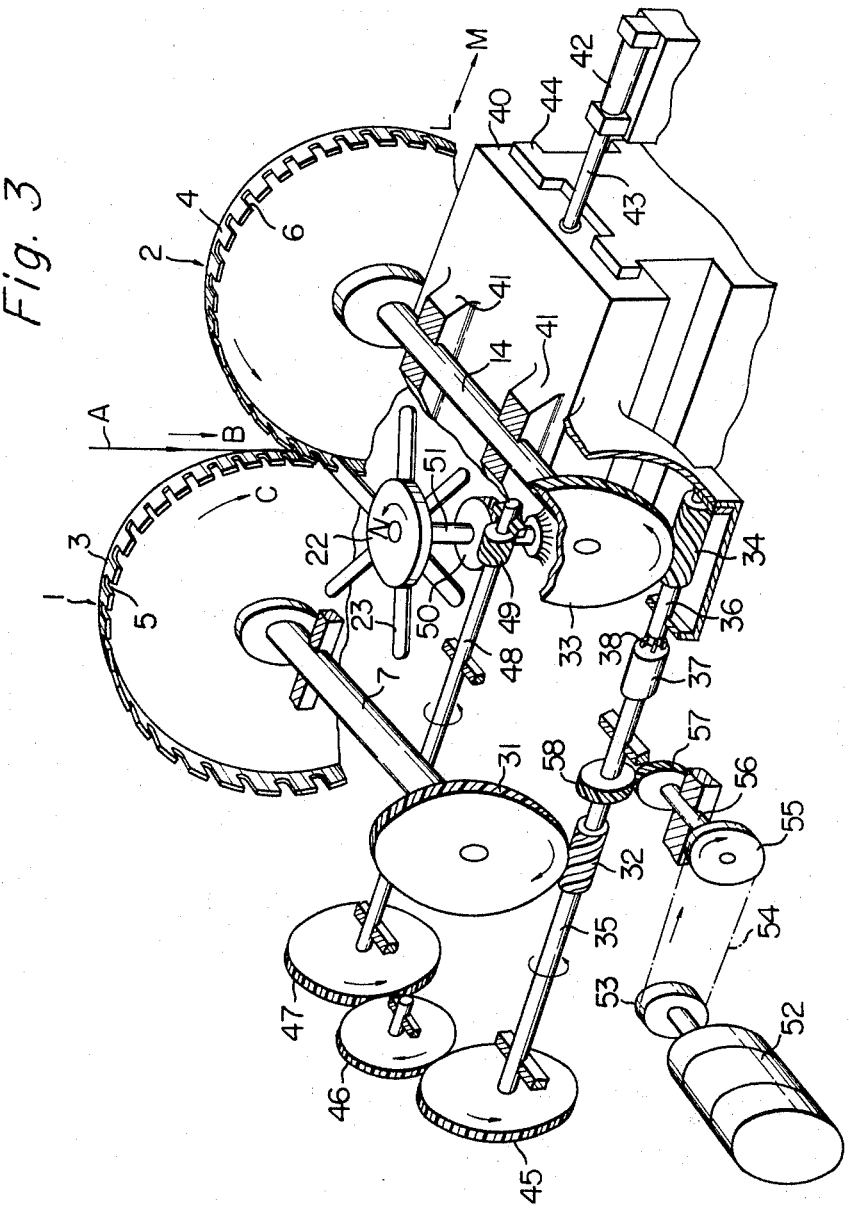
FIG. 3 is a perspective view of the mechanism of the apparatus according to the present invention.
Figure 4:
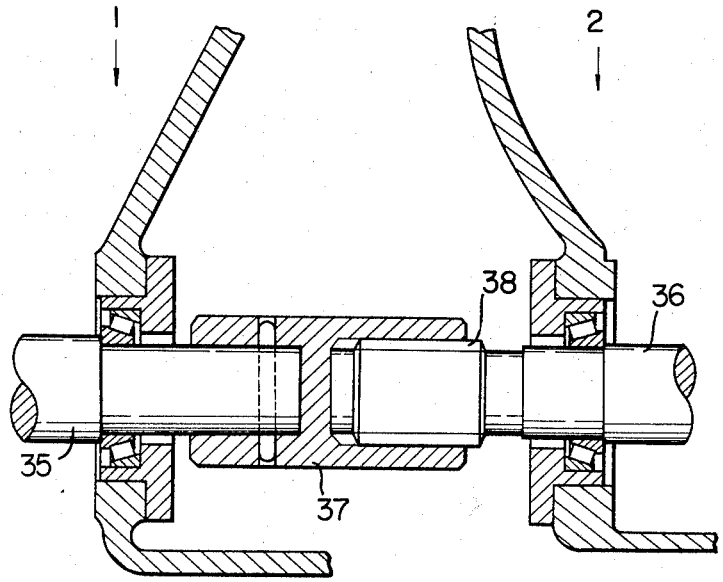
FIG. 4 is an enlarged sectional view of a coupling of the present invention.

Slotted disks 1 and 2 are the same type as hereinbefore described and their disposition is also the same. The transmission of power to the shaft 7 carrying the first disk 1 and the shaft 14 carrying the second disk 2 is accomplished by means of helical gears 31 and 33 disposed on the respective shafts 7 and 14 at the ends remote from the disks, and another set of helical gears 32 and 34 which mesh with the gears 31 and 33. Shaft 35 on which the gear 32 is mounted and the shaft 36 on which the gear 34 is mounted are coaxial, the two shafts being coupled by means of a coupler 37 on shaft 35 engaging splines 38 on the shaft 36. Shaft 14 is journaled in bearings 41, 41 provided on a table 40, and the table 40 is moved along a bed 44 in the directions of arrows L and M by the action of an air cylinder 42 and a piston rod 43. The rotation of the shaft 35 is transmitted to a shaft 48 through a gear 45 mounted on the end of the shaft 35 and gears 46 and 47. The rotation of the shaft 48 then causes the shaft 51 of a cutter 22 to rotate through helical gears 49 and 50. In FIG. 3 is shown a motor 52 for driving the apparatus, the shaft 35 being supplied power through a pulley 53, belt 54, pulley 55, shaft 56 and a pair of helical gears 57 and 58. In FIG. 2 the covers 59 and 60 for the shaft 14 and gears 33 and 34, respectively, are shown, as is the housing 61 for encasing that part of the apparatus other than the disks.

The apparatus operates in the following manner. When the motor 52 is started, the shaft 35 rotates in the direction indicated by the arrow, and the disks 1, 2 are rotated together therewith in the directions of arrows C and D through the hereinbefore described mechanism. Table 40 is normally urged in the direction of arrow L by the piston rod 43 of the air cylinder 42, and hence the disks normally rotate with the flange surfaces in contact with each other. On the other hand, the cutter 22 is driven from the shaft 35 via the gear train and is rotated in the direction of the arrow N and the blades 23 move in the direction in which the slots are aligned so that they pass through the channels made by aligned slots. Thus, the fiber tow A fed between the disks in the direction B is cut into prescribed lengths by means of the blades 23 of the cutter 22. Since the transmission of power to the shafts 7 and 14 is accomplished in this case by means of two pairs of helical gears, the number of gears employed is much less than in the case of the conventional apparatus, and hence it is possible to accomplish the transmission of much greater power with very little backlash. As the size of the fiber tow that is held between the disks becomes thicker, the distance between the disks, and hence the shafts 7 and 14, must become greater. In this event, the table 40 moves in the direction of arrow M against the pressure of the air cylinder 42. However, since the shafts 35 and 36 are coupled by a coupler 37 sliding on splines 38, displacement takes place between the shafts 35 and 36 in an amount corresponding to the displacement of the table 40, and the shafts 7 and 14 remain in the same relative position but spaced farther apart in the direction of the slot alignment. In the embodiment shown, the shafts remain parallel and in the same plane. Hence, the corresponding slots in the respective disks are always in the same alignment, in the present embodiment the same horizontal plane, and the proper relationship between the slots is maintained where the disks contact and the plane through which the cutter blade rotates is such as to not impede the rotation of the cutter, thus making possible the smooth cutting of the tow.

Because the movable shaft in the conventional apparatus moves through an arc, the positions of the respective slots at the contacting surfaces of the disks are not always in the same horizontal plane. Thus, even though the power is transmitted smoothly between the two shafts by means of the gear train 9 . . . 12, the line along which the slots come into alignment varies upwardly or downwardly as the thickness of the tow changes. This prevents the passage of the cutter blade 23, which always moves horizontally through the channel by the alignment of the slots. Further, when power is transmitted by means of a train of a plurality of spur gears, the great backlash of the gears causes difficulties in the transmission of power and deranges the synchronous rotation of the disks so as to prevent the cutter blade from passing through the channel formed by the slots.

As hereinbefore described, the number of gears in the apparatus of the present invention is few, and hence there is little backlash of the gears and power transmission can be satisfactorily accomplished even though a thick tow is being fed between the disks. Therefore, the cutting of a synthetic fiber tow of above 300,000 deniers can be satisfactorily accomplished.

The objects of the present invention can be achieved even if the shaft 14 is not parallel to shaft 7, for example if it is inclined somewhat with respect to the shaft 7, provided that the movable shaft is made to move in the same plane in which the slots are aligned and the slots are provided in the disks so that they are aligned with each other when the disks come into contact with each other, thus permitting the passage of the blade through the channel to be formed by the slots. Hence, since many changes and modifications can be made in the above-described details by those skilled in the art without departing from the nature and spirit of the invention, it is to be understood that the invention is not to be limited to said details except as set forth in the appended claims.

What is claimed is:

1. A fiber tow cutting apparatus comprising a first disk having a flange thereon with slots therein, a shaft mounted in a fixed position in space and on which said first disk is mounted for rotation, a second disk having a flange thereon with slots therein, a shaft mounted for movement in space and on which said second disk is mounted for rotation, the flange in said second disk being opposed to the flange on said first disk, and the slots of said two disks coming into alignment when said two disks rotate relative to each other, mounting means on which said movable shaft is mounted and linearly movable toward and away from the first disk in the direction in which the slots are aligned, said mounting means comprising a table and a piston having a rod coupled to said table, said table being movable horizontally, said means being movable in the same plane as that in which the shaft of the first disk is disposed, a rotating cutter for cutting a tow being fed between the two disks, said cutter having at least one cutter blade moving in the direction in which said slots are aligned and through a channel formed by the alignment of the slots of said disks, and means driving said two shafts synchronously.

2. A fiber tow cutting apparatus comprising a first disk having a flange thereon with slots therein, a shaft mounted in a fixed position in space and on which said first disk is mounted for rotation, a second disk having a flange thereon with slots therein, a shaft mounted for movement in space and on which said second disk is mounted for rotation, the flange in said second disk being opposed to the flange on said first disk, and the slots of said two disks coming into alignment when said two disks rotate relative to each other, mounting means on which said movable shaft is mounted and linearly movable toward and away from the first disk in the direction in which the slots are aligned, a rotating cutter for cutting a tow being fed between the two disks, said cutter having at least one cutter blade moving in the direction in which said slots are aligned and through a channel formed by the alignment of the slots of said disks, and means driving said two shafts synchronously, said driving means comprising a pair of helical gears for each of said shafts with one gear of the pair on the shaft, two aligned shaft sections coupled by an extensible coupling, the other gear in each pair being on one of said shaft sections, and motor means coupled to one of said shaft sections.

References Cited

UNITED STATES PATENTS 2,851,103   9/1958   Anthony _____ 83—913 X

WILLIAM S. LAWSON, *Primary Examiner.*